Figure 1:
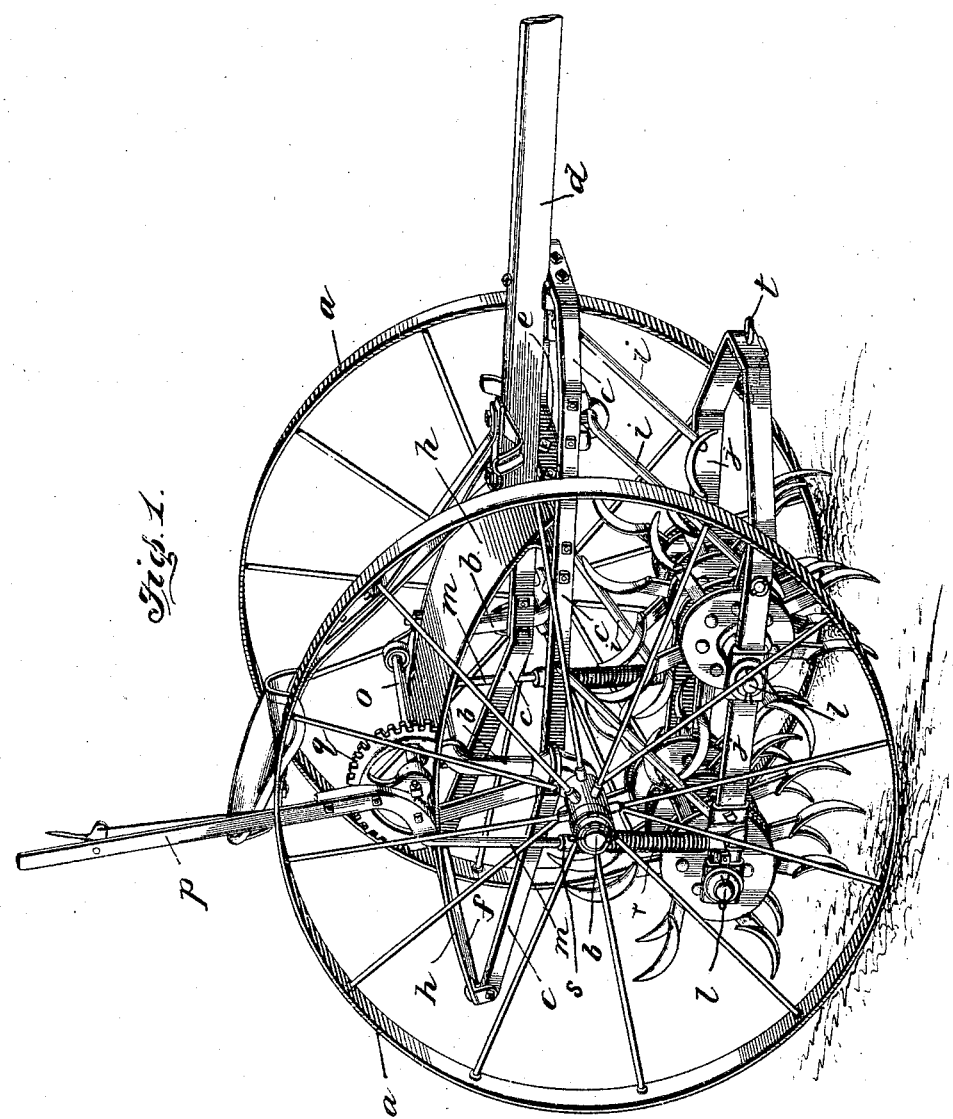

No. 688,625. Patented Dec. 10, 1901.
C. P. A. FRIBERG.
STUBBLE DIGGER.
(Application filed Dec. 24, 1900.)
(No Model.) 2 Sheets—Sheet 1.

Witnesses
Inventor
C. A. Friberg,
By
Attorneys

No. 688,625. Patented Dec. 10, 1901.
C. P. A. FRIBERG.
STUBBLE DIGGER.
(Application filed Dec. 24, 1900.)
(No Model.) 2 Sheets—Sheet 2.
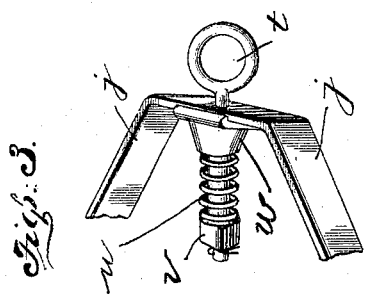
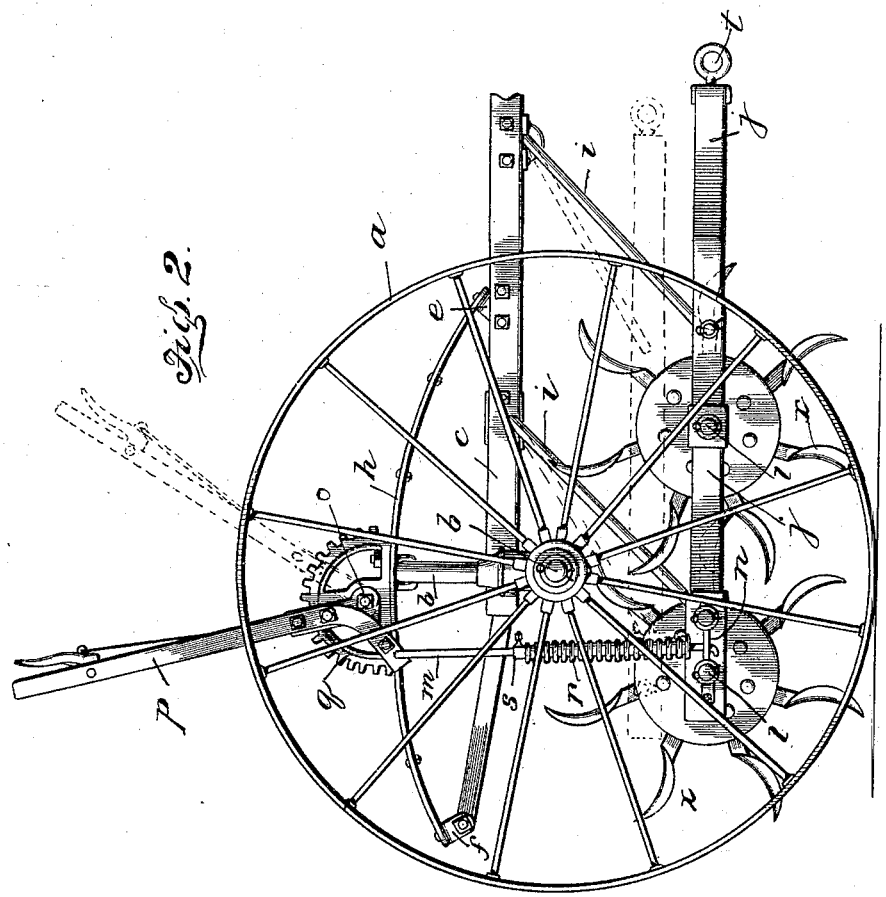

UNITED STATES PATENT OFFICE.

CHARLS P. A. FRIBERG, OF MOLINE, ILLINOIS.

STUBBLE-DIGGER.

SPECIFICATION forming part of Letters Patent No. 688,625, dated December 10, 1901.

Application filed December 24, 1900. Serial No. 40,969. (No model.)

*To all whom it may concern:*

Be it known that I, CHARLS P. A. FRIBERG, a citizen of the United States, residing at Moline, county of Rock Island, State of Illinois, have invented certain new and useful Improvements in Stubble-Diggers; and I do hereby declare the following to be a full, clear, and exact description of the invention, such as will enable others skilled in the art to which it appertains to make and use the same.

The invention has to do with that class of machines which are employed for working over the stubbles of sugar-cane, and the particular purpose of the machine is to open up the soil around the roots of the cane, so that the sun and air can penetrate them.

The improvements relate specifically to the manner of supporting and carrying the digger-heads and the manner of applying the draft to the team.

The accompanying drawings, forming part of this specification, illustrate a machine embodying these improvements.

Figure 1 of the drawings is a perspective view of the complete machine from a point diagonally in front of the driver's seat. Fig. 2 is a side elevation of the machine. Fig. 3 is a detail view showing the elastic draft-tug and its connection with the heads-frame.

Referring to the views, $a\ a$ denote the supporting-wheels of the machine, and $b\ b$ indicate the axle, which is preferably arched, as shown in Fig. 1.

The main or wheel frame of the machine consists of side bars $c\ c$, which are securely bolted to the upright parts of the axle $b$ and extend forwardly around the front part of the machine, where they are secured to the tongue in any suitable manner. Supplemental bars also extend backwardly from the rear ends of the front bars, as best shown in Fig. 1. A cross-bar $e$ joins the side bars together at a point in front of the axle, and a similar cross-bar $f$ unites the rear ends of the bars together in rear of the axle. Secured at its opposite ends to these cross-bars is an arched hood or cover $h$, which is secured to and supported midway between its ends by the arched part of the axle $b$.

The toothed digger-heads are carried by a supplemental frame which is suspended from the main or wheel frame just described by means of pivoted links $i\ i\ i\ i$. This supplemental frame is shaped somewhat like the front part of the wheel-frame and is composed of side bars $j\ j$, that are brought together at their front ends. One pair of links $i\ i$ connects the front end of the supplemental frame with the corresponding end of the main frame, and the other pair of links $i\ i$ connects the rear end of the supplemental frame with the main frame at a point slightly in front of the axle. These links are pivoted at their opposite ends to the main and supplemental frames, respectively, and are parallel with one another, so that the supplemental frame will be maintained in a horizontal position as it rises and falls. The digger-heads are loosely journaled upon shafts $l\ l$, which are secured at their opposite ends in the side bars of the supplemental frame, and this frame is adapted to be raised and lowered by means of rods $m\ m$, connected at their lower ends to lugs $n$ on the supplemental frame and at their upper ends attached to crank-arms on a rod $o$, which is adapted to be rocked by means of a hand-lever $p$, having a thumb-latch by means of which it may be locked in any desired position into a segment-rack $q$. The shaft $o$ and the rack and lever are mounted upon the hood or cover $h$, being securely bolted thereto immediately over the arched axle $b$. The lower ends of the rods $m$ slide loosely through eyes in the lugs $n$, thereby permitting the supplemental frame to rise freely, but allowing it to be lifted by the rods when the adjusting-lever is thrust forward, as indicated in dotted lines in Fig. 2. A coiled spring $r$ encircles each of the rods between an adjustable collar $s$ secured thereon and a lug on the side bars of the supplemental frame, thus holding the frame down with an elastic pressure which may be varied by altering the position of the levers.

In this class of machines the draft of the team has usually been applied to the wheel-frame. My invention, however, contemplates the application of the draft to the supplemental frame which carries the digger-heads. The draft of the wheel-frame is comparatively light, and the greatest resistance comes from the heads-frame dragging over the ground.

I therefore apply the draft directly to the point of greatest resistance, and in connection with the parallel-link arrangement, whereby the frame is suspended from the main frame, it tends to hold the heads down to their work.

Any suitable form of draft-tug may be employed; but I prefer the construction illustrated in Fig. 3, where $t$ denotes an eyebolt, the shank of which extends through an opening in the front end of the supplemental-frame bars $j$ and has a coil-spring $u$ encircling it between a nut $v$ on its rear end and a clip $w$, that bears against the inner side of the frame-bars $j$.

As will be noted, more especially from Fig. 2 of the drawings, the parallel links, by means of which the heads-frame is suspended from the main frame, are connected to the main frame at points considerably in advance of their point of connection with the supplemental frame. The object of this arrangement is to give the latter a trailing action, allowing it to rise and fall freely with the inequalities of the ground and at the same time causing the draft connection to hold it and the digger-heads down to their work.

Having thus described my invention, I wish to be understood as not limiting myself to the particular details of the frame construction herein described; but

What I claim and desire to secure is—

1. In a wheeled digger, the combination with the wheel-frame extending forwardly of the axle and having a tongue, of a supplemental frame underlying the wheel-frame and carrying the digger toothed heads, a pair of rearwardly-inclined links pivotally connecting the front part of said supplemental frame to the front part of the wheel-frame, a pair of similarly-inclined links pivotally connecting the rear part of the supplemental frame to the corresponding part of the wheel-frame, said pairs of links being parallel so that the supplemental frame will be kept horizontal as it rises and falls, a hand lifting-lever on the wheel-frame, and a link connecting the hand-lever with the supplemental frame.

2. In a wheeled digger, the combination with the wheel-frame extending forwardly of the axle and having a tongue, of a supplemental frame underlying the wheel-frame and carrying the digger toothed heads, a pair of rearwardly-inclined links pivotally connecting the front part of said supplemental frame to the front part of the wheel-frame, a pair of similarly-inclined links pivotally connecting the rear part of the supplemental frame to the corresponding part of the wheel-frame, said pairs of links being parallel so that the supplemental frame will be kept horizontal as it rises and falls, a hand lifting-lever on the wheel-frame, a draft connection with the supplemental frame, and a spring reacting between the two frames to keep the digger-heads down to the ground.

3. In a wheeled digger, the combination with the wheel-frame extending forwardly of the axle and having a tongue, of a supplemental frame underlying the wheel-frame and carrying the digger toothed heads, a pair of rearwardly-inclined links pivotally connecting the front part of said supplemental frame to the front part of the wheel-frame, a pair of similarly-inclined links pivotally connecting the rear part of the supplemental frame to the corresponding part of the wheel-frame, said pairs of links being parallel so that the supplemental frame will be kept horizontal as it rises and falls, a hand lifting-lever on the wheel-frame, a separate link connecting the hand-lever with the supplemental frame, a coiled spring surrounding the link and reacting between the frames, and a spring draft-tug connected to the supplemental frame.

In testimony whereof I affix my signature in presence of two witnesses.

CHARLS P. A. FRIBERG.

Witnesses:
FRANCIS W. HUNT,
ROBERT FOSTER.